INVENTORS
ROGER ARTHUR DAVIS
ALAN ROBERT HEWITT
BY Hane and Nydick
ATTORNEYS

Sept. 26, 1961 R. A. DAVIS ET AL 3,001,469

DATA REGISTERING APPARATUS

Filed June 22, 1959 2 Sheets-Sheet 2

INVENTORS
ROGER ARTHUR DAVIS
ALAN ROBERT HEWITT
BY Hane and Nydick
ATTORNEYS 3,001,469

DATA REGISTERING APPARATUS

Roger Arthur Davis and Alan Robert Hewitt, Letchworth, England, assignors to International Computers and Tabulators Limited Filed June 22, 1959, Ser. No. 822,092
Claims priority, application Great Britain June 25, 1958
17 Claims. (Cl. 101—93)

The present invention relates to cyclically operable character recording apparatus and is concerned in particular with the operation of such apparatus in combination with a signal source providing character representing signals in which a character is represented by a pulse at one of a first set of $n$ time positions distributed over a first signal period and in some cases by an additional pulse at one of a second set of $m$ time positions distributed over a second signal period, $n$ and $m$ being positive integers.

The present invention is limited in its application to cyclically operable character recording apparatus of the kind, hereinafter referred to as the kind specified, in which the possible characters are presented for selection for recording in a fixed sequence during each operative cycle of the apparatus, the character sequence comprising $n$ groups of characters which groups are associated one with each of the $n$ time positions of the first set, are presented in the same order and with the same time spacing as the associated time positions and each comprise all the characters of which the representation is or includes a pulse at the associated time position. The characters of a group are themselves arranged to be presented in the order such that those which are represented by an additional pulse are presented in the same order and with the same time spacing as the second set of time positions and are followed by the character represented by a single pulse at the associated time position of the first set.

The character recording apparatus may record the characters in any known manner, for example by printing or punching, by presenting them for visual recognition or by recording by a photographic or like process. The characters will usually be numerical and alphabetical characters, with the possible addition of associated symbols, but they may be other characters such as Braille characters for example. In particular, the apparatus may, for example, be a wheel printing mechanism.

Where such an apparatus is required to operate at high speeds, characters being required to be recorded at a rate of 120 or more characters per minute, it is necessary for the actuation of the apparatus to be precisely timed, if no errors are to arise. Whilst in all cases the character representing signal periods will be nominally synchronised to the cycles of operation of the apparatus, it may not be possible or convenient for them to be rigidly synchronised. It is therefore necessary to provide some means whereby accurately timed signals for actuating the apparatus can be derived from only nominally synchronised input signals.

According to the present invention there is provided a cyclically operable character recording apparatus of the kind specified for operation in combination with a signal source providing character representing signals in which a character is represented by a pulse at one of a first set of $n$ time positions distributed over a first signal period and in some cases by an additional pulse at one of a second set of $m$ time positions distributed over a second signal period, the signal source feeding the signals so that the first set of time positions are each nominally at a predetermined time prior to the times at which the first character of the associated group is presented for recording during an operative cycle of the apparatus and the second signal period precedes the first, the apparatus being provided with first storage means having $m$ separate stages each of which is associated with one of the second set of time positions and is set on receipt of a pulse at the associated time position in a second signal period and a further stage which is set during each second signal period, second storage means having a single stage which is set during a first signal period at the time of receipt of a pulse at one of the first time positions, means rigidly synchronised to the operation of the apparatus for generating group pulses which are accurately timed with respect to the times of presentation of the first characters of each group, and character pulses which are accurately timed with respect to the time of presentation of successive characters and are distributed cyclically over $(m+1)$ channels corresponding one to each of the character positions in a group, means for applying the group pulses to the second storage means so that the stage is reset by the first group pulse generated after it is set, means responsive to resetting of the second storage means for rendering resetting circuits for the stages of the first storage means operable, means coupling each of said $(m+1)$ channels to the resetting circuit of the corresponding stage of the first storage means so that each stage that has been set, is reset by the first character pulse applied to its resetting circuit after it has been rendered operable, and means for applying an actuating signal to the recording apparatus in response to the resetting of the first stage reset in the first storage means during the first signal period, the timing of the character pulses being such that an actuating signal causes recording of the character represented by the input signals giving rise to it.

The various stages of the first and second storage means may include any form of bistable device, provided that its switching times are sufficiently rapid. Thus such bistable devices as trigger circuits employing thermionic or cold cathode valves or transistors may be employed. Similar circuits involving electromagnetic relays are not in general suitable for high speed operation, however. Preferably, the bistable devices are annular magnetic storage cores constructed of a ferro-magnetic material of the kind having a so-called rectangular hysteresis loop.

In many cases the signal source may be a record feeding and sensing mechanism, and particularly a punched record card feeding and sensing mechanism, adapted for operation with records having character representing indicia (these may for example be perforations, marks or areas of predetermined magnetisation on a magnetic surface) in one or more columns, each column having a first set of $n$ positions and a second set of $m$ positions at which indicia may occur, a character being represented in each column by an indicium at one of the first set of positions and in some cases an additional indicium at one of the second set of positions, the mechanism having means for sensing the columns of a record simultaneously position by position to generate pulses timed according to the positions of the indicia sensed, an indicium in a position of the first set producing a pulse at the corresponding one of $n$ time positions in a first signal period and an indicium in a position of the second set producing a pulse at the corresponding one of $m$ time positions in a second signal period.

Where the signal source includes a plurality of channels, i.e. a plurality of columns, the reproducing device will usually include a corresponding plurality of character reproducing channels and it will be appreciated that it will be necessary to provide first and second storage means for each channel.

Where, in a record feeding and sensing mechanism the records are fed so that the first set of positions precede the second set of positions, the mechanism may have two sensing stations, the second signal period being that in which the second set are sensed at the first station and the first signal period being that in which the first set are sensed at the second station. In such a case each operative cycle of the recording apparatus will correspond to the period in which the first positions are sensed at the second station and it may execute one or more idle cycles between operative cycles. If, also, it is required to feed the records at a rate such that one is being sensed at the second station at the same time as a succeeding one is being sensed at the first station, it will be necessary to duplicate the first storage means for every column and to provide switching means arranged so that pulses sensed at the first station from successive records are fed alternately to the duplicate storage means.

In some cases, as is known for punched record cards, one or some of the second set of positions on a record may be coincident with some of the first. In such cases means must be provided to operate during the period following the generation of the group pulse corresponding to that position to prevent resetting of those stages of the first storage means which correspond to those positions, until after the further stage has been reset.

Whilst the feeding and sensing mechanism may operate on separate records such as punched cards, a number of records may be distributed over the length for example, of a magnetic or paper tape, or a reel of photographic film or the like.

An apparatus according to the present invention including a punched record card feeding and sensing mechanism and a wheel printing apparatus will now be described, by way of example, with reference to the accompanying drawings, in which.

Figure 1:
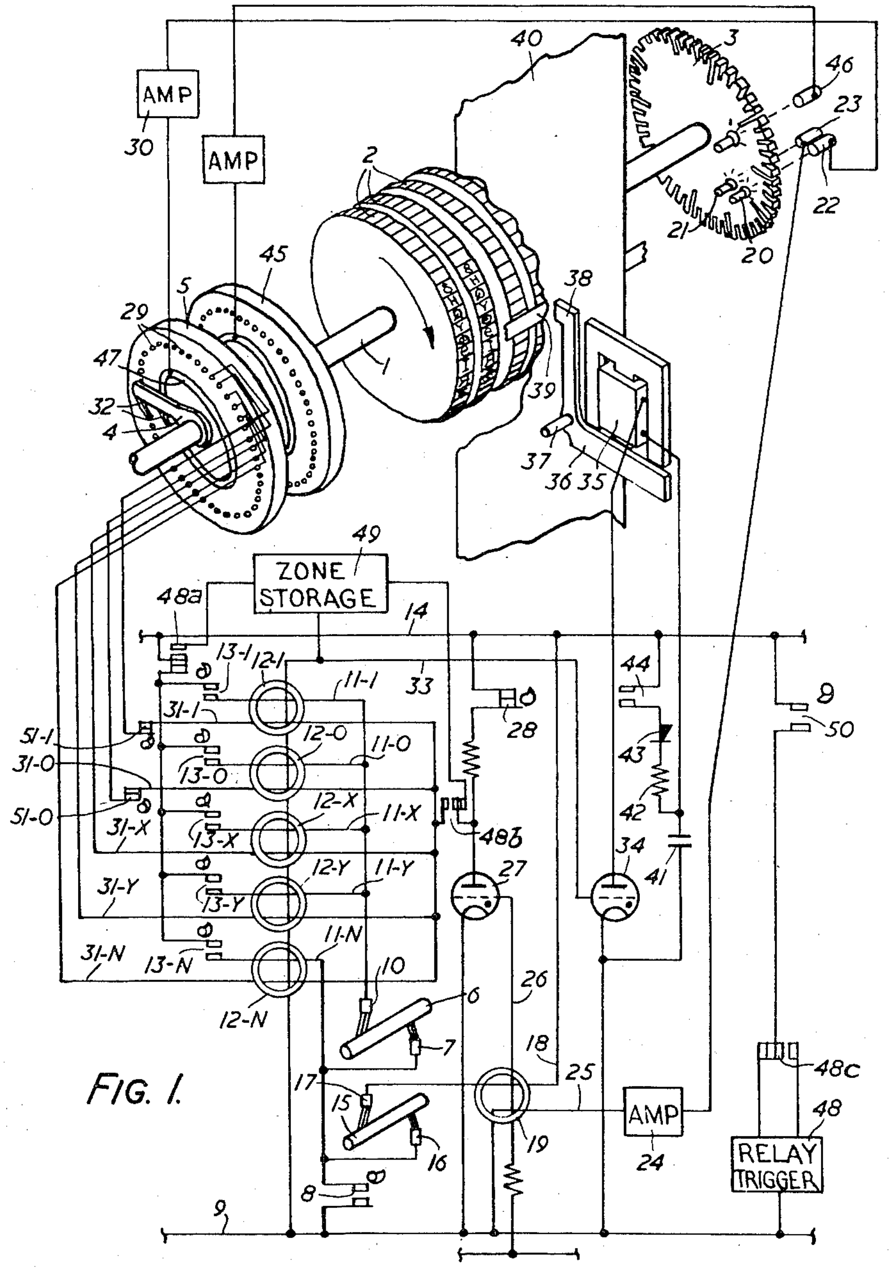
FIGURE 1 shows a schematic diagram of the apparatus.

In the apparatus described in the following example, characters are printed in response to signals sensed from a record card on which characters are represented in conventional manner by means of indicia which are perforations at predetermined positions in the columns of the record card, the character being determined according to a predetermined code. A numerical character is represented by a single perforation in a card column, the position of the perforation in one of the nine numeral positions 0–9 representing the appropriate value 0–9. An alphabetical or other character is represented by a perforation in one of the numeral positions 2 to 9 accompanied by a second perforation in one of four so-called zone positions. The zone positions are the numeral positions "0" and "1" and two further positions designated "X" and "Y." Taking the numeral positions as the first set of indicia positions and the zone positions as the second set, the integer *n* and *m* referred to above are respectively ten and four, but two of the second set of positions are coincident with two of the first set.

The columns on a card are sensed simultaneously by conventional apparatus having two sensing stations which each include a brush or other sensing element for each column of a card, and the record cards are fed from a supply hopper through the first station, through the second station and are finally passed into a card stacker. The cards are fed through the sensing stations broadside on so that the columnar positions (index points) pass through the sensing stations in succession in the order 9, 8, 7, 6, 5, 4, 3, 2, 1, 0, X and Y. A suitable record card feeding and sensing apparatus having two sensing stations is described in British patent specification No. 605,132. The construction of this apparatus and the control of feeding and sensing, however, form no part of the present invention and will be described further only so far as is required for an understanding of the present invention.

Sensing of one or more perforations in a card column actuates a selecting circuit to print the corresponding character in a printing mechanism of the kind specified and comprising a continuously rotating type wheel, having type elements for all the characters disposed in order around its periphery. A sheet of paper or other document and an inked ribbon are held close to the periphery of the type wheel and at the appropriate moment are impelled against wheel by an electromagnetically actuated hammer to effect printing of the character of which the type element is at the printing position opposite the hammer. The correct timing of the actuation of the hammer relative to the rotation of the wheel is obtained by a selecting circuit responsive to the timing of the pulses obtained by sensing of the card column. It will be appreciated that a similar selecting circuit is employed for each card column, and that a separate type wheel and hammer are provided for each column, all the type wheels however being mounted on a common shaft and printing on the same sheet of paper. For clarity, only a single selecting circuit and hammer mechanism are shown in the drawing and described below.

The card feeding and sensing apparatus is driven from the same motive power source, for example an electric motor, as the type wheel shaft, the drive being geared so that four complete revolutions of the type wheels correspond to the sensing of one card by both stations, the index points 9 to 0 being sensed at the first station during the first revolution, the index points X and Y being sensed at the first station in the first fifth of the second revolution, the card passing to the second station during the remainder of the second revolution for sensing of the index points 9 to 0 during the third revolution and of index points X and Y during the first part of the fourth revolution. Cards are fed to the first sensing station at the commencement of alternate revolutions of the type wheel. The revolutions of the type wheels in which sensing of the index points 9 to 0 takes place are printing cycles and will be referred to for convenience as such whilst the other alternate cycles are idle cycles.

The characters on each type wheel are arranged in groups of five, each group being associated with one of numeral perforation positions in a column and including the numeral itself and four other characters. The other characters of the group correspond, according to a code, to the presence of two perforations on the card, one in the numeral position concerned and the other in one of the four zone positions. For example, the group associated with the numeral positions "9" comprises the characters "¾," "Z," "R," "I" and "9." The card code employed for the recording of characters in a column is such that perforations in both the 9 and 1 positions represent "¾"; "Z" is represented by perforations in both positions 9 and 0, "R" by 9 and X and "I" by 9 and Y; and a perforation in the 9 position only represents the character 9.

The full code may, for example, be as shown in Table I below but it will be appreciated that other codes, including other characters if required, may be employed as convenient, and that such characters need not necessarily be directly comprehensible as for the accepted numerical and alphabetical characters.

*Table I*

| Numeral Position | Zone Position | | | | |
|---|---|---|---|---|---|
| | 1 | 0 | X | Y | None |
| 9 | ¾ | Z | R | I | 9 |
| 8 | @ | Y | Q | 4 | 8 |
| 7 | . | X | P | G | 7 |
| 6 | ½ | W | O | F | 6 |
| 5 | / | V | N | E | 5 |
| 4 | – | U | M | D | 4 |
| 3 | ¼ | T | L | C | 3 |
| 2 | % | S | K | B | 2 |
| 1 | ------ | & | J | A | 1 |
| 0 | ------ | ------ | 10 | 11 | 0 |

The order of the character elements on the type wheel and the direction of rotation of the wheel is such that the characters are presented at the printing position opposite the hammer in the order obtained by reading from left to right across the rows of Table I taken in order from top to bottom.

Referring now to FIGURE 1 of the drawings, there are shown parts of a printing mechanism having a continuously rotating shaft 1 on which a plurality of type wheels 2 are rigidly mounted, the number of wheels 2 being equal to the maximum number of columns on a card in which character-representing perforations may occur. A sheet of paper 40, part of a roll (not shown) fed past the type wheels 2 in known manner, extends vertically past the type wheels 2, an inked ribbon 39 lying between the sheet 40 and the wheels 2. Print hammers 38 (only one is shown) are pivoted on a shaft 37 and each can be actuated briefly to impel the sheet 40 against the part of the corresponding type wheel 2 at the printing position, by an electric impulse applied to the coil 35 of an associated electromagnet. This attracts the armature 36 which is integral with the hammer 38, and causes the hammer 38 to strike the sheet 40. It will be appreciated that there is a separate electromagnet with an associated coil 35 and armature 36 for each hammer 38.

The shaft 1 also carries a slotted disc 3 and a contact arm 4 which is associated with a distributor 5.

A slot is provided in the disc 3 for each character on the type wheel 2, and light sources 20 and 21 are arranged to co-operate with photo-electric cells 22 and 23 so that the cell 22 generates a pulse shortly before each character reaches the printing position. There are therefore fifty slots. There being five characters in each group associated with a numeral position in a card column, every fifth slot is elongated, and the photo-electric cell 23 is arranged to scan the elongations of these slots, so that the cell 23 generates a pulse shortly before the first character of each group reaches the printing position. The pulses generated by the cells 22 and 23 will be referred to as character and group pulses respectively.

The distributor 5 is a fixed insulating disc provided with a ring of fifty contact sectors 29. It also has a continuous metallic ring 47, concentric with the ring of sectors 29, the disc and thus the rings being coaxial with the shaft 1. The contact arm 4 which rotates with the shaft 1, carries two contact brushes 32, one continuously in contact with the ring 47 and the other passing over the sectors 29 in turn as the shaft 1 rotates. The character pulses generated by the photo-electric cell 22 are passed through an amplifier 30 to the ring 47 and the disc of the distributor 5 is oriented so that successive character pulses coincide with contact of the brush 32 concerned with successive ones of the sectors 29. The sectors 29 are divided into groups of five, corresponding to the groups of characters on the wheel 2, and corresponding ones of the ten groups are connected together and to the corresponding one of a group of five leads 31–1, 31–0, 31–X, 31–Y and 31–N (for clarity the connections between only two groups of sectors 29 are shown in FIGURE 1). In operation, the character pulses from the cell 22 are distributed cyclically round the channels formed by the leads 31, those on lead 31–1 corresponding to characters the code of which includes a perforation in the "1" zone position, those on leads 31–0, 31–X and 31–Y to characters the code of which includes a "0," "X" or "Y" zone position perforation respectively and those on the lead 31–N to the numeral characters. Cam operated contacts 51–1 and 51–0 are included in the lead 31–1 and 31–0. These are normally closed and the purpose and occasion of their opening will be described later in this specification.

The first sensing station through which a card passes comprises a sensing roll 6 of conventional form, which is connected by means of a common contact brush 7 through circuit breaker contacts 8 to a negative voltage supply line 9. The circuit breaker contacts 8 are actuated by a cam mechanism and are closed at times corresponding to the passage of each perforation position of a column past the sensing roll 6. A sensing brush 10 (only one is shown) is associated with each column of a card and makes contact with the roll 6 through the perforations which exist in that column. The brush 10 for the particular column with which we are concerned is connected in common to one end of each of a group of four switching windings 11–1 to 11–Y. The switching windings 11–1 to 11–Y are each associated with one of a group of bistable magnetic storage cores 12–1 to 12–Y respectively. The other end of each winding 11–1 to 11–Y is connected by means of an appropriate one of a group of cam actuated contacts 13–1 to 13–Y through a contact 48*a* of a trigger relay 48 to a positive voltage supply line 14 (contact 48*a* will be assumed for the moment to remain in the position shown in FIGURE 1). Each of the contacts 13–1 to 13–Y is closed to complete the circuit to the corresponding one of the switching windings 1–1 to 11–Y at the time when the corresponding perforation position on a card is sensed by the brush 10.

The cores 12–1 to 12–Y are initially in a first stable state and, if a perforation is sensed, for example, in the Y position so that a circuit is completed between the supply lines 14 and 9, the corresponding winding 11–Y is energised and the core 12–Y is set to its second stable state. The remaining cores would be set in a similar manner if perforations were sensed in the appropriate position on a card.

A further bistable magnetic core 12–N is also provided and is set by the closing of cam-actuated contacts 13–N in a similar way. The contacts 13–N close once in every card sensing cycle, but since the switching winding 11–N for the core 12–N is connected directly to the contacts 8, the core 12–N is set in each card sensing cycle without regard to the sensing of a perforation. The five cores 12–1 to 12–N together form a first storage means having four stages (cores 12–1 to 12–Y) associated with the respective zone positions and a further stage 12–N which is set whenever a card is sensed at the first station.

The second card sensing station to which a card is passed after sensing at the first station includes a common roll 15 connected by means of a common contact brush 16 to the contacts 8. A column sensing brush 17 of which there is one for each column, is connected to a switching winding 18 associated with a second storage means formed by a synchronising bistable magnetic storage core 19, and the other end of the winding 18 is connected to the positive supply line 14. Thus, the first sensing of a perforation in the column concerned by the brush 17 completes a circuit between the supply lines 9 and 14 energising the winding 18 and setting the core 19 which is normally in its first state, to its second state. As stated, the card is fed so that the columnar positions are sensed in the order 9, 8, 7, 6, 5, 4, 3, 2, 1, 0, X, Y. If, for example, the character "R" is represented in the column under consideration, there will be perforations in the positions 9 and X. Therefore, during the passage of the card past the first station the cores 12–X and 12–N are set, and as the card passes the second station the core 19 is set when the perforation in the "9" position is sensed.

The relationship between the sensing of the columnar positions under control of the contacts 8 and the movement of the type wheels 2 is such that each numerical position is sensed a short time before the first of the associated group of characters on the type wheel 2 reaches the printing position.

This relative timing is determined by the relative alignments of the drives to the shaft 1 and the card feeding and sensing mechanism. It is however subject to variations due, for example, to variations in machine loading, to backlash in driving gears, to wear of sensing brushes or variations in perforation positions and, in determining the time by which sensing precedes the first character of the group reaching the printing position, account is taken of this variation so that the order of events is preserved.

In addition, the alignment of the disc 3 relative to the print wheels 2 is such that the character and group impulses generated by the cells 22 and 23 occur at times preceding those at which the corresponding characters reach the printing position by a short interval. This last interval is fixed as the print wheels 2 and the disc 3 are rigidly mounted on the same shaft 1, and is shorter than the minimum time by which sensing of a numeral position precedes the arrival of the first of the corresponding group of characters at the printing position.

Figure 2:
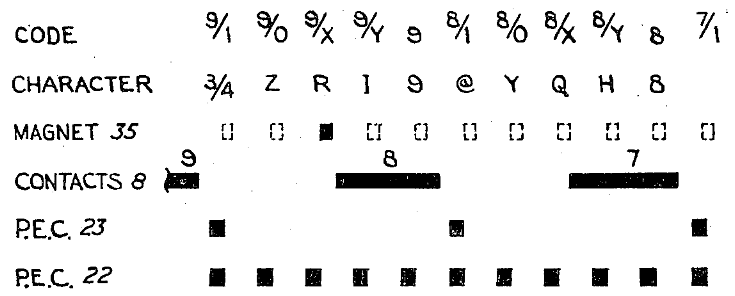
FIGURE 2 is a timing chart for the operation of the apparatus of FIGURE 1.

FIGURE 2 illustrates these relative timings for part of a sensing cycle, the first row showing the column perforations, the second the character concerned, the third the time at which the printing magnet 35 is energised, the fourth the time of closing of the contacts 8 for the sensing of successive numeral positions and the fifth and sixth the durations of the pulses from the photo-electric cells 22 and 23.

The group pulses generated by the cell 23 are amplified by an amplifier 24 (FIGURE 1) and applied to energise a resetting winding 25 of the core 19. Energisation of this winding is effective to reset the core 19 only upon the occurrence of the first group impulse generated in the cell 23 after the core 19 has been set by sensing of a perforation by the brush 17. The energisation of the winding 25 in response to any subsequent group impulses is ineffective since the core 19 is already reset. Thus, in the case of the character R, the core 19 is reset just as the group of characters on the type wheel associated with the numeral 9 is approaching the printing position.

The core 19 has a read-out winding 26 which is connected to the grid of a gas-filled relay valve 27. Resetting of the core 19 causes a positive-going impulse to be generated in the read-out winding 26 which fires the valve 27.

Each of the cores 12–1 to 12–N has the corresponding one of the leads 31–1 to 31–N extending through it as a resetting winding, these resetting windings being connected together at their ends remote from the sectors 29 to the anode of the valve 27 through contacts 48*b* of the relay trigger 48. As will be explained, the contacts 48*b* are transferred into the opposite position to that shown in FIGURE 1 when reading out from the cores 12–1 to 12–N takes place.

The resetting windings for the cores 12–1 to 12–N are rendered operable by firing of the valve 27 and, only when that has occurred, is the application of a character pulse from the cell 22 to one of the leads 31 effective to reset the core with which it is associated. As described above, character pulses are distributed over the five leads 31–1 to 31–N in synchronism with the passage of the groups of characters past the printing position so that the pulses are applied to the cores 12–1 to 12–N just before each of the associated characters is at the printing position.

The valve 27 is fired only after resetting of the core 19 when it remains fired until the cam-actuated contacts 28 open. This occurs in each sensing cycle after the last of the numeral positions has passed the second sensing station. As a result, resetting of the cores 12–1 to 12–N will occur during the first cycle of pulses on the lines 31–1 to 31–N following resetting of the core 19. Thus, in the case of the letter "R," the cores 12–X and 12–N are reset during the passage past the printing position of the group of characters associated with the numeral 9. A common read-out winding 33 is coupled to all the cores 12–1 to 12–N and impulses resulting from the resetting of these cores 12–1 to 12–N are passed as a pulse train, one pulse for each core reset, to the grid of gas-filled relay valve 34. The timing of the individual pulses in this train is determined by the scanning operation of the distributor 5 so that the pulse generated by the resetting of the core 12–X occurs at the time when the character "R" is approaching the printing position.

The valve 34 is triggered by the first pulse of the train. Since neither of the cores 12–1 or 12–0 was set, this first pulse corresponds to the resetting of core 12–X. The anode circuit of the valve 34 includes the coil 35 of the associated hammer electromagnet and firing of the valve 34 causes energisation of the coil 35 with consequent printing of the character "R." The timing of the character pulses from the cell 22 precedes the arrival of the associated character at the printing position by a time sufficient to allow for delays inherent in the action of this circuit and the hammer.

A short impulse only is delivered to the coil 35 by the valve 34 under control of a capacitive quenching circuit. This includes a capacitor 41 which is charged before each sensing cycle and is connected in series with the coil 35 across the valve 34, so that the valve 34 when fired conducts for a time dependent upon the charge of the capacitor 41. This brief energisation period of the electromagnet causes the hammer 38 to deliver a rapid blow to the sheet 40 as is necessary to prevent blurring or double printing. The capacitor 41 is recharged during the parts of the alternate idle revolutions of the shaft 1 when no sensing is taking place, the cam actuated contacts 44 which are otherwise open, then being closed to complete a charging circuit through a resistor 42, and a diode 43. Since the valve 34 is fired and the capacitor 41 discharged by the first of any train of pulses generated by resetting of some or all of the cores 12–1 to 12–N, any subsequent pulse of the same train has no effect on the printing mechanism.

If in any case, only the core 12–N is set, the character being a numeral and there being no zone perforation, the pulse due to resetting of this core 12–N will be effective to cause firing of the valve 34 and printing of the numeral concerned.

As two of the numeral positions, positions "1" and "0," are also used as zone positions, it is necessary to break the resetting circuits of cores 12–1 and 12–0 during the periods for sensing the numeral positions "1" and "0" at the second station. The necessity for this arises since a "1" or "0" perforation will give rise to setting of the core 12–1 or 12–0 respectively regardless of whether it has numeral or zone significance. If it has numeral significance, as in the case of the characters of the last two lines of Table I, at least one of the other cores 12–0 to 12–N in the case of core 12–1 or 12–X to 12–N in the case of core 12–0 should be set and should be effective to cause firing of the valve 34. This will not occur if resetting of the core 12–1 or 12–0 is allowed to take place in the normal way, as the resultant pulse will precede that from the core which should be effective. To prevent this, the contacts 51–1 and 51–0 are provided in the leads 31–1 and 31–0. These are cam operated and open during sensing of the "1" and "0" positions respectively at the second station. Resetting of the core concerned is thus prevented from occurring at a time when it would interfere with correct printing of the character concerned. Resetting ready for the next printing cycle occurs at the first application of a character pulse to the lead 31–1 or 31–0 after re-closing of the contact 51–1 or 51–0, the valve 27 which renders the resetting circuits operable remaining on until after the "X" and "Y" positions have been sensed. The impulse generated on resetting is ineffective as the valve 34 will have been fired previously, discharging the capacitor 41, and recharging does not occur until after the "Y" position has been sensed.

From the foregoing description it will be seen that zone perforations are sensed from the card at the first sensing station and that this zone information is stored on the cores 12–1 to 12–N until the card is sensed at the second station. While the circuit so far described will operate correctly for a single card fed through both sensing stations it is apparent that errors in selection will occur when a succession of cards is fed since one card is sensed at the second station at the same time as the following card is sensed at the first station. For example, if the first card contains a numeral perforation in the one position and the following card is perforated to represent a character having a perforation in the one position as a zone position, the zone part of the latter coding will be lost as the core 12–1 is reset as a result of sensing the first card. The same will apply to a zero zone perforation following a zero numeral perforation.

For this reason, the first storage means is duplicated, the duplicate being shown in FIGURE 1 by the block marked zone storage 49 which is provided with a group of storage cores connected in exactly the same manner as the cores 12–1 to 12–N. The two groups of cores are selected to store the zone information sensed during alternate sensing cycles of the first sensing station by the contacts 48*a* and 48*b* of relay 48. The relay 48 is a trigger relay operated under control of its own contacts 48*c* by impulses from contacts 50 which are actuated by a cam mechanism during the period between the sensing the "Y" position in one sensing cycle and the commencement of the next sensing cycle. The relay 48 has two coils and is mechanically latched in its operated or non-operated position. The first impulse from the contacts 50 passes through the contacts 48*c* and energises the operating coil, causing the contacts 48*c* to transfer so that the next impulse is diverted to the second coil to cause the relay to restore to its original condition. A relay circuit operating in this manner is described in British patent specification No. 704,860.

In operation, the first card is sensed at the first sensing station and the information sensed from the zone positions is stored on the cores 12–1 to 12–N, the contacts 48*a*, being in the position shown in FIGURE 1. During the passage of the card between the first and second stations the relay 48 changes over the contacts 48*b* from the position shown in FIGURE 1 to allow the resetting circuits of the cores 12–1 to 12–N to be rendered operable by firing of the valve 27, zone information being sensed from the following card now at the first station being stored in the zone storage 49 as the contacts 48*a* are now transferred. For the next sensing cycle, contacts 48*a* and *b* are changed back to the positions in FIGURE 1, so that zone information from a third card is stored on cores 12–1 to 12–N and zone storage 49 is read out under control of valve 27.

Where, as in this example, there are a large number of type wheels, it is desirable to distribute the electrical and mechanical loading of the machine when a large number of like characters is required to be printed simultaneously. To this end, alternate ones of the type wheels 2 are displaced with respect to the remainder through an angle corresponding to half a character. A second distributor 45 is provided, its orientation with respect to its associated contact brushes (not visible in FIGURE 1) being arranged to correspond to that of the displaced set of type wheels 2. A separate photo-electric cell 46 is used in conjunction with this distributor and is positioned with respect to the disc 3 to generate character pulses at instants having the required timing relative to the presentation at the printing position of the character on the displaced type wheels 2.

It is unnecessary, however to provide a second photo-electric cell corresponding to the cell 23 since the re-timing of the character pulses by the distributor 45 allows the proper selection of the characters, without the need for the re-timing the group pulses.

It will be appreciated that the type wheels and the record card sensing devices must be nominally synchronised but, provided that the sensing of a numerical perforation at the second sensing station takes place before the group pulse from the photo-cell 23 relating to the corresponding character group and after the group pulse relating to the previous group, the sensing devices are not required to be rigidly synchronised to the type wheels. Thus, variations in timing between the sensing devices and the type wheels due, for example, to variations in machine loading, backlash in driving gears or to wear of sensing brushes or variations in perforation position have no effect on the correct selection of characters to be printed.

The impulses which are used for synchronising purposes are described as being generated by photo-electric cells but it will be appreciated that other pulse generating devices may be used, for example, contacts actuated by a cam carried by the shaft 1.

Similarly, the record may be sensed by other means than the brushes shown, and the record may be made on other media than perforated cards. For example the medium may be a card or tape upon which records are made by marks, and the sensing means might then operate photo-electrically.

What is claimed is:

1. A cyclically operable character recording apparatus of the kind specified for operation in combination with a signal source providing character representing signals in which a character is represented by a pulse at one of a first set of $n$ time positions distributed over a first signal period and in some cases by an additional pulse at one of a second set of $m$ time positions distributed over a second signal period, the signal source feeding the signals so that the first set of time positions are each nominally at a predetermined time prior to the times at which the first character of the associated group is presented for recording during an operative cycle of the apparatus and the second signal period precedes the first, the apparatus being provided with first storage means having $m$ separate stages each of which is associated with one of the second set of time positions and is set on receipt of a pulse at the associated time position in a second signal period and a further stage which is set during each second signal period, second storage means having a single stage which is set during a first signal period at the time of receipt of a pulse at one of the first time positions, means rigidly synchronised to the operation of the apparatus for generating group pulses which are accurately timed with respect to the times of presentation of the first characters of each group, and character pulses which are accurately timed with respect to the time of presentation of successive characters and are distributed cyclically over $(m+1)$ channels corresponding one to each of the character positions in a group, means for applying the group pulses to the second storage means so that the stage is reset by the first group pulse generated after it is set, means responsive to resetting of the second storage means for rendering resetting circuits for the stages of the first storage means operable, means coupling each of said $(m+1)$ channels to the resetting circuit of the corresponding stage of the first storage means so that each stage that has been set, is reset by the first character pulse applied to its resetting circuit after it has been rendered operable, and means for applying an actuating signal to the recording apparatus in response to the resetting of the first stage reset in the first storage means during the first signal period, the timing of the character pulses being such that an actuating signal causes recording of the character represented by the input signal giving rise to it.

2. Apparatus according to claim 1 which is a wheel printing mechanism including a print wheel mounted for rotation about its centre and having character type elements arranged in the required sequence around its periphery, an impression receiving medium and a hammer mechanism to which said actuating signals are applied momentarily to press the medium against the periphery of the wheel to effect printing of a character when it is presented at the printing position opposite the hammer.

3. Apparatus according to claim 2 in which there are a plurality of print wheels mounted on a common shaft for rotation about their centres and an equal plurality of independent hammer mechanisms, there being provided separate first and second storage means for each print wheel.

4. Apparatus according to claim 3 in which the character pulse generating means comprises a slotted disc mounted for rotation with the print wheels on the common shaft and having a slot corresponding to each character, photo-electric means and a light source arranged relative to the disc so that photo-electric means is illuminated by the source only when a slot in the disc is at a predetermined angular position, the slots being disposed around the disc so that on rotation of the common shaft in operation they reach said position in turn at a predetermined time prior to the presentation of the corresponding character at the printing position, means for deriving a train of pulses, one for the passage of each slot past said position, from the current flowing in the photo-electric means and means for distributing said pulses cyclically over said $(m+1)$ channels.

5. Apparatus according to claim 4 in which the group pulse generating means comprises an additional photo-electric means and light source associated with said disc, the slots in the disc which correspond to the first character of each group being extended as compared with the remainder and the additional photo-electric means and light source being positioned so that illumination of the photo-electric means by the source takes place through the extension of said slots when they are at said predetermined position, and said group pulse generating means further comprising means for deriving a train of pulses, one for the passage of each extended slot past said position, from the current flowing in the additional photo-electric means.

6. Apparatus according to claim 5 in which said distributing means comprises a fixed disc mounted coaxially with the common shaft and a contact arm mounted on the common shaft for rotation therewith, the disc carrying a plurality of contacts arranged in a circle, one for each character, and a single continuous circular contact and the contact arms on rotation successively connecting each of the plurality of contacts to the circular contact, means for applying the train of pulses to be distributed to the circular contact, and $(m+1)$ output leads each connected to all the contacts of the corresponding one of the $(m+1)$ sets formed from said plurality of contacts by selecting every $(m+1)$th of the contacts in order, starting in each case from a different one of a set of $(m+1)$ successive contacts.

7. Apparatus according to claim 1 having record feeding and sensing mechanism adapted for operation with records having character representing indicia in columns, each column having a first set of $n$ positions and a second set of $m$ positions at which indicia may occur, a character being represented in each column by an indicium at one of the first set of positions and in some cases an additional indicium at one of the second set of positions, the mechanism being driven in nominal synchronism with the character recording apparatus and having means for sensing the columns of a record simultaneously position by position to generate pulses timed according to the positions of the indicia sensed, an indicium in a position of the first set producing a pulse at the corresponding one of $n$ time positions in a first signal period and an indicium in a position of the second set producing a pulse at the corresponding one of $m$ time positions in a second signal period.

8. Apparatus according to claim 7 in which the record feeding and sensing mechanism is operative to sense perforated record cards.

9. Apparatus according to claim 8 in which in the record feeding and sensing mechanism, the records are fed so that the first set of positions precede the second set of positions, the mechanism having two sensing stations, the second signal period being that in which the second set are sensed at the first station and the first signal period being that in which the first set are sensed at the second station.

10. Apparatus according to claim 9 in which the character recording apparatus and the record feeding and sensing mechanism are coupled to be driven so that records are fed to the first sensing station of the mechanism for sensing of the first set of indicia positions during one cycle of operation of the recording apparatus and are fed to the second sensing station for sensing of the first set of indicia positions during the next but one cycle of operation of the recording apparatus, the intervening cycles of the recording apparatus being idle cycles in which recording does not take place.

11. Cyclically operating printing apparatus operable to print characters represented by electrical signals, some of the character signals consisting of a single pulse at one of $n$ time positions in a first time period and others of the character signals consisting of a single pulse at one of said $n$ time positions together with a single pulse at one of $m$ time positions of a second time period, said apparatus comprising first storage device with $(m+1)$ storage stages; means responsive to a pulse at any one of said $m$ time positions to set a corresponding one of $m$ of said $(m+1)$ storage stages; means operative to set the $(m+1)$ storage stage during each second time period; a second storage device with a single storage stage; means responsive to a pulse at any one of said $n$ time positions to set the storage stage of the second storage device; a continuously rotating type wheel; group pulse generating means operating in synchronism with the type wheel to generate a succession of pulses corresponding to the succession of $n$ time positions; means to apply each of the group pulses to the storage stage of the second storage device to reset it if it has been set by a character representing signal; character pulse generating means operating in synchronism with the type wheel to generate a succession of $(m+1)$ pulses for each of said group pulses; means to apply each of said $(m+1)$ character pulses to a corresponding one of said $(m+1)$ storage stages; means responsive to resetting of the second storage device to render said character pulses effective as resetting signals for the stages of said first storage device; and means responsive resetting of one of the stages of said first storage device to effect printing of a character from said type wheel.

12. Apparatus for printing any of a plurality of characters under control of zone and numerical indications sensed from a record, said apparatus comprising a character bearing type wheel continuously rotated to pass the characters sequentially through a printing position; means operative to sense the zone and numeric positions of a column of a record in sequence; a group of first bistable storage devices, one for each zone position; means responsive to the sensing of a zone indication in one of the zone positions of said column to set a corresponding one of the first storage devices; a second bistable storage device; means operable to set the second storage device when said zone positions are sensed; a third bistable storage device; means responsive to the sensing of a numeric indication to set said third storage device; first pulse generating means operating in synchronism with the rotation of the type wheel to generate a pulse following the sensing of each numeric position; means to apply said pulses to the third storage device to effect resetting of said device if it has been set; second pulse generating means operating in synchronism with the rotation of the type wheel to generate a train of pulses following each pulse from the first generating means; means to apply each pulse of said train to a different one of said first storage devices and to said second storage device; means responsive to resetting of the third storage device to render the pulses of said train effective to reset any of the first and second storage devices which are set; and means responsive to resetting of one of the first and second storage devices to effect printing from that character of the type wheel which is at the printing position.

13. Apparatus for printing any one of a plurality of characters under control of zone and numerical indications sensed from a record, said apparatus comprising a character bearing type wheel continuously rotated to pass the characters sequentially through a printing position; means operative to sense sequentially the zone and numeric positions of a column of record; a group of first bistable magnetic storage cores, one for each zone position; means responsive to the sensing of a zone indication in one of the zone positions of said column to set a corresponding one of the first storage cores; a second bistable magnetic storage core; means operable to set the second storage core when said zone positions are sensed; a third bistable magnetic storage core; means responsive to the sensing of numeric indication to set said third stoarge core; first pulse generating means synchronized with the rotation of the type wheel and operative to generate a pulse following the sensing of each numeric position; means to apply said pulses to the third storage core to effect resetting of said core if it has been set; second pulse generating means synchronized with the rotation of the type wheel and operative to generate a train of pulses following each pulse from the first generating means; means to apply to each one of the first storage cores and to said second storage core a different pulse of said train of pulses; means responsive to resetting of the third storage core to render the pulses of said train effective to reset any of the first and second storage cores which are set; and means responsive to resetting of one of the first and second storage cores to effect printing from that character of the type wheel which is at the printing position.

14. Apparatus for printing characters under control of zone and numerical indications sensed from a sequence of records, said apparatus comprising a character bearing type wheel continuously rotated to pass the characters sequentially through a printing position; means operative to sense in sequence the zone and numeric positions of each record; a group of first bistable storage devices, one for each zone position; a group of second bistable storage devices, one for each zone position; means for rendering the first and second storage devices responsive to zone indications sensed from alternate ones of said sequence of records, the sensing of a zone indication in one of the zone positions of a record being effective to set a corresponding one of the storage devices of a group; third and fourth bistable storage devices; means operable to set the third and fourth storage devices alternately when the zone positions of said sequence of records are sensed; a fifth bistable storage device; means responsive to the sensing of a numeric indication in a column of a record to set the fifth bistable storage device; first pulse generating means operative synchronously with the rotation of the type wheel to generate a pulse following the sensing of each numeric position; means to apply said pulses to the fifth storage device to effect resetting of said device if it has been set; second pulse generating means operative synchronously with the rotation of the type wheel to generate a train of pulses following each pulse from the first generating means; distributing means operative to apply the pulses of said train sequentially to the storage devices of each group of storage device and to the third and fourth storage device; means responsive to resetting of the fifth storage device to render the pulses of said train effective to reset any set storage device to which they are applied; and means responsive to the resetting of a storage device by one of said train of pulses to effect printing from that character of the type wheel which is at the printing position.

15. Apparatus according to claim 14 in which each bistable storage device comprises a magnetic storage core.

16. Apparatus as claimed in claim 14 in which the means responsive to resetting of the storage devices by the pulses of said train, comprises a gas filled valve having a control grid connected in common to all the storage devices except the fifth storage device, the resetting of any of such storage device causing firing of the valve; an electro-magnet connected to the valve for energization thereby when the valve fires; and a printing hammer controlled by said electro-magnet.

17. Apparatus according to claim 16 comprising a capacitor discharged through the electro-magnet when the valve fires; and switching means operable between the sensing of successive records of said sequence for recharging the capacitor.

References Cited in the file of this patent

UNITED STATES PATENTS

| | | |
|---|---|---|
| 2,692,551 | Potter | Oct. 26, 1954 |
| 2,757,605 | Dumey | Aug. 7, 1956 |
| 2,906,200 | Pfleger | Sept. 29, 1959 |
| 2,909,995 | Hannibal | Oct. 27, 1959 |
| 2,915,966 | Jacoby | Dec. 8, 1959 |
| 2,915,967 | Gehring | Dec. 8, 1959 |